E. A. AND A. T. RYON.
GLASS GRINDING MACHINE.
APPLICATION FILED JUNE 12, 1919.
1,372,553.
Patented Mar. 22, 1921.
2 SHEETS—SHEET 2.
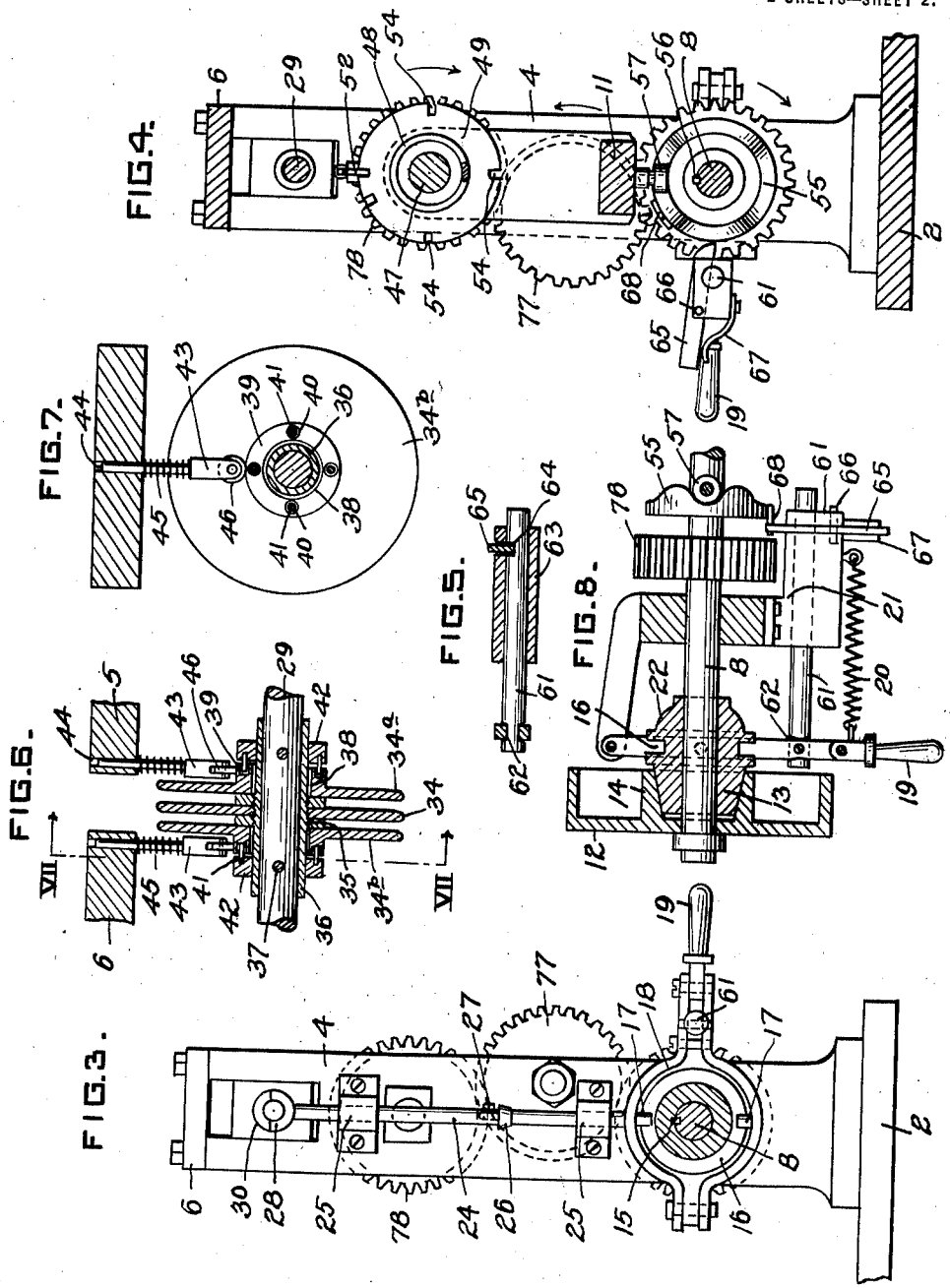
WITNESSES
INVENTOR

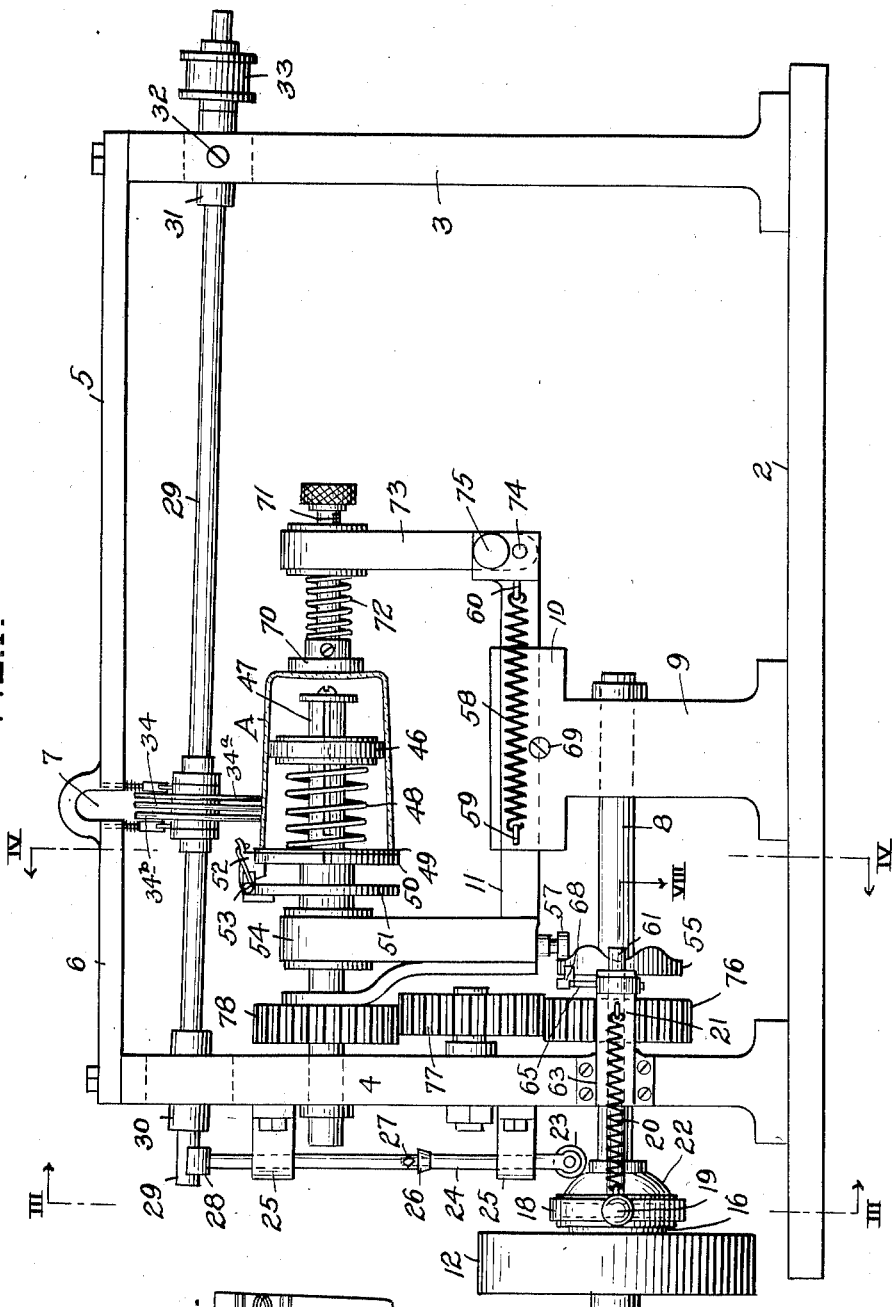

UNITED STATES PATENT OFFICE.

EDWARD A. RYON AND ANNA T. RYON, OF PITTSBURGH, PENNSYLVANIA, ASSIGNORS TO QUALITY GLASS COMPANY, OF PITTSBURGH, PENNSYLVANIA, A CORPORATION OF DELAWARE.

GLASS-GRINDING MACHINE.

1,372,553.  Specification of Letters Patent.  Patented Mar. 22, 1921.

Application filed June 12, 1919. Serial No. 303,574.

*To all whom it may concern:*

Be it known that we, EDWARD A. RYON and ANNA T. RYON, citizens of the United States, residing at Pittsburgh, in the county of Allegheny and State of Pennsylvania, have invented certain new and useful Improvements in Glass-Grinding Machines, of which the following is a specification.

Our invention consists of an improvement in glass grinding machines for engraving tumblers or similar cylindrical glass articles, and has for its object to provide means for quickly and cheaply ornamenting the surface of such articles by direct application of a grinding or cutting wheel or wheels.

The improvement consists generally in providing a rotatable holder for the ware having means for placing on and removing the ware therefrom, means for shifting the ware longitudinally when it is desired to engrave other than continuously annular lines, cam mechanism for effecting alternating back and forth longitudinal movement to the ware holder and ware, one or more engraving wheels, and a rotating driven shaft therefor, with means providing for automatic adjustment of the wheels, automatic mechanism for terminating the operation, and other features of construction and advantage as shall be more fully hereinafter described.

In the drawings illustrating one preferred embodiment of the invention,

Figure 1 is a view in front elevation, showing the mechanism in operative position;

Fig. 2 is a view of an engraved tumbler in elevation;

Fig. 3 is an end view partly in section indicated by the line III—III of Fig. 1;

Fig. 4 is a transverse vertical section on the line IV—IV of Fig. 1, in the direction of the arrows;

Fig. 5 is a detail sectional view of the clutch shaft and its latch mechanism;

Fig. 6 is an enlarged sectional detail view of the cutting wheels and their mounting;

Fig. 7 is a sectional view on the line VII—VII of Fig. 6; and

Fig. 8 is a horizontal section on the line VIII, VIII of Fig. 1.

The framework of the machine consists of a suitable base 2 upwardly from which extend the two main housing arms or frames 3—4 to the tops of which are connected by bolts or otherwise, the inwardly extending cross arms 5—6 respectively provided with the intervening clearance opening 7. The main drive shaft 8 is journaled in housing 4 and an intervening bearing 9 secured to base 2 and provided at its upper end with a slide bearing 10 in which is slidably mounted the main supporting bar 11 of the ware carrier.

The outer end of shaft 8 is provided with a loosely mounted pulley 12 having a clutch 13 adapted to make frictional driving connection between the pulley and a clutch cone 14. Said clutch is splined on shaft 8, as indicated at 15, and is provided with an annular groove 16 for engagement of lugs 17 of a clutch lever 18 having a handle 19. The spring 20 is connected at one end to the clutch lever 18 and at the other end to a fixed projecting attachment of the frame 21, whereby to exert constant tension inwardly on lever 18 to release the clutch.

The inner portion of the clutch 14 is provided with a cone shaped terminal 22 adapted to engage a terminal roller 23 of thrust rod 24 vertically movable in guiding bearings 25—25 extending from housing 4. Thrust rod 24 is preferably made of two sections jointed at 26 by means of a telescoping connection and a securing set screw 27, whereby to adjust the thrust rod accurately to perform its functions. The upper end of the thrust rod is provided with a half round or forked terminal 28 engaging under the end of cutter wheel shaft 29, so as to raise it in its housing 4 to throw the cutting wheels upwardly from engagement with the ware, upon inward movement of cone 22.

Cutter wheel shaft 29 is, as shown, disposed generally in a line parallel with the longitudinal tapered face of the ware A, one end being journaled in a bearing 30 which is vertically slidable in the upper portion of housing 4, the other end being journaled in a bearing 31 which is pivoted by stud bolts or screws 32 in the upper portion of housing 3 providing for the desired vertical adjustment to and from the ware, as hereinafter described. The shaft 29 is also provided at its outer end with a driving pulley 33 by which it may be rotated at the desired high speed for rotation of the cutter or cutters.

In the construction shown I utilize a plurality of cutters 34, 34ᵃ and 34ᵇ, although it will be understood that any desired number may be employed. Ordinarily, one of the cutters, as the middle one, is fixedly mounted by any suitable means as threaded connections 35 with sleeve 36 secured by pins 37 to shaft 29. In this manner, cutter 34 is rigidly connected with the shaft and may be raised and lowered with it toward and from the ware.

The supplemental cutters 34ᵃ and 34ᵇ are adapted to have a limited degree of relative lateral movement, so as to compensate for any variations in the surface of the ware, for which purpose their hubs are provided with a lost motion enlargement 38 around the sleeve 36, and are also provided with projecting hubs 39. Hubs 39 in turn are provided with a series of annular holes 40 into which project pins 41, with a corresponding amount of clearance, from drive rings 42 also secured to sleeve 36 and shaft 29 by pins 37. By such connection, the several cutting wheels are rotatably connected with shaft 29. The relatively adjustable wheels 34ᵃ and 34ᵇ are normally pressed toward the ware by studs 43 having terminal rollers 44 engaging the peripheries of hubs 39, as shown in Figs. 6 and 7, and studs 43 are mounted for vertical movement in guiding openings or sockets 44 in cross bars 5 and 6 respectively, with an intervening spring 45. By this means constant downward pressure is normally exerted on the adjustable cutting wheels, and they are also cushioned to provide for a limited degree of upward movement away from the ware upon inward movement of cam 22, as described.

The ware A is held by a rotating disk 46, preferably of suitable resilient material upon which the ware is thrust, disk 46 being splined upon shaft 47 and with an inner cushioning spring 48 to insure engagement and compensation for any variations in the tapered interior diameter of the ware. Its edge is thrust against a bearing disk 49 of suitable material forming a part of the relatively adjustable disk 50 which is freely journaled by its hub on shaft 47. In this manner it is capable of relative annular adjustment on the shaft as to a fixedly secured disk 51 provided at its upper end with a spring actuated latch 52 pivoted to the disk 51 at 53. Disk 50 is provided with a plurality of notches 54, either one of which may be engaged by latch 52, whereby to rotate the ware around bearing disk 46 to any desired position with relation to disk 51, and as to its previous position on shaft 47. Such adjustment is provided for the purpose of making the second curved series of design lines on the ware shown in Fig. 2.

Alternating longitudinal movement is imparted to the ware carrying frame and the ware itself during cutting action of the wheels by action of a suitably designed cam wheel 55 held by key 56 on shaft 8, and adapted to engage a roller 57 on reciprocable carriage 11. A spring 58 secured at 59 to standard slide bearings 10 and at 60 to the carriage frame, tends to always thrust the carriage inwardly with its roller against the undulating face of cam 55, so that as the cam rotates a corresponding back and forth movement will be imparted to the frame.

For the purpose of automatically disengaging the cutter wheels from contact with the ware at the end of one complete revolution thereof, clutch lever 18 is connected with a controlling locking bar or pin 61 by engagement of the upper and lower sides of the shifting lever with a recessed portion at the end of the bar 61, as indicated at 62. Pin 61 is mounted for longitudinal thrusting movement in a supporting guide 63 extending outwardly from housing 4, as shown, and the other end portion of pin 61 is provided with a transverse locking notch 64. A holding plate 65 is pivoted at 66 to bearing 63, and is normally thrust into notch 64 by action of spring 67 (see Fig. 4). Its inner end projects beyond pin 61 into range of an abutment 68 secured to cam 55, which abutment at the termination of the cutting operation comes into engagement underneath with the terminal of blade 65, raising it out of engagement with notch 64, allowing pin 61 to travel forwardly beyond the blade under action of spring 20. At the same time, the clutch 14 comes away from engagement with driving pulley 12 and cone 22 raises roller 23, and lifts shaft 29 and the cutter wheels away from the ware.

When it is desired to cut the straight annular lines on the ware, as indicated in Fig. 2, the cam 55 is merely removed, whereupon, the ware is rotated annularly without longitudinal back and forth movement, as will be readily understood. The ware itself is capable of adjustment with its holding mechanism by adjusting the entire carriage frame 11 in its bearing 10 back or forth, and securing it thereon by means of a securing set screw 69. In operation, it will be understood that the curved lines may be cut successively on any desired number of pieces of ware by the cam controlling operation above described, the ware then being replaced for subsequent cutting of the desired straight lines.

The ware A is clamped to position on its holding mechanism by an end bearing head 70 mounted on the inner end of an adjusting set screw 71 with an intervening cushioning spring 72, whereby to prevent rigid pressure and possible breakage of the ware. Such clamping means is mounted on the upper end of a carrying arm 73 pivoted to the end of bar 11 at 74, and provided with a releasable locking pin 75. By this means the arm 73 may be unlocked and thrown outwardly each time for removal and application of a new piece of ware.

The rotation of the ware by its shaft 47 is through a train of gearing 76, 77, 78, by which motion is transmitted from the main driving shaft 8. When the ware is adjusted for operation, assuming pulley 12 to be driven, clutch lever 18 is thrust outwardly by the operator, bringing the clutch 14 into driving engagement with the pulley, at the same time lowering the cutting wheels by retraction of cone 22 and drawing pin 61 outwardly, allowing latch 65 to drop into notch 64. The lever may then be released and the operation continued for one complete revolution of the ware and cam 55 until latch blade 65 is automatically released by cam abutment 68 at the completion of the cutting operation, whereupon the clutch will be disconnected as described, the cutters will be raised, and the ware may then be removed.

The construction and operation of the machine will be readily understood from the foregoing description, and it will be found to accomplish its desired objects in a rapid, successful and economic manner, while many variations in the desired design may be made by the use of various forms of cam 55, or of the number and spacing of the cutting wheels 34.

The invention may be variously changed or modified in design, proportion, or detail construction by the skilled mechanic, but all such changes are to be considered as within the scope of the following claims.

What we claim is:

1. A glass grinding machine having a horizontally rotatable and longitudinally movable ware holder, gearing therefor, clutch mechanism for connecting the gearing with a source of power having a cone shaped terminal and a power driven cutter having engaging and disengaging mechanism operable by said terminal in conformity with the clutch mechanism.

2. A glass grinding machine having a horizontally rotatable and longitudinally movable ware holder, gearing therefor, clutch mechanism for connecting the gearing with a source of power having a cone shaped shifting portion, a power driven cutter, and means engaging the shifting portion of the clutch for disengaging the cutter from the ware.

3. A glass grinding machine having a rotatable ware holder, gearing therefor, clutch mechanism for connecting the gearing with a source of power having a cone shaped shifting portion, an independently operating power driven shaft having a cutter-wheel thereon, and means engaging said shaft and the shifting portion of the clutch for moving the shaft and cutter away from the ware.

4. A glass grinding machine having a rotatable ware holder, gearing therefor, clutch mechanism for connecting the gearing with a source of power having a cone shaped shifting portion, an independently operating power driven shaft having a cutter-wheel thereon located above the ware holder and adapted to approach and engage the ware when the clutch mechanism is connected, and means engaging said shaft and the shifting portion of the clutch for moving the shaft and cutter away from the ware when the clutch mechanism is disconnected.

5. A glass grinding machine having a rotatable ware holder, gearing therefor, clutch mechanism for connecting the gearing with a source of power having a shifting cone, a vertically movable power driven shaft having a cutter-wheel thereon, and a shift rod engaging said shaft and having a roller engaging the shifting cone.

6. A glass grinding machine having a rotatable ware holder, gearing therefor, clutch mechanism for connecting the gearing with a source of power having a shifting cone, a vertically movable power driven shaft having a cutter-wheel thereon, a spring for pressing the cutter-wheel toward the ware, and a shift rod engaging said shaft and having a roller engaging the shifting cone.

7. A glass grinding machine having a rotatable ware holder, gearing therefor, clutch mechanism for connecting the gearing with a source of power having a shifting cone, a vertically movable power driven shaft having a fixed and a laterally movable cutter-wheel thereon, and means engaging the shifting cone for moving the shaft and cutters away from the ware.

8. A glass grinding machine having a reciprocable ware holding frame provided with a rotatable ware holder, a cutter, a main driving shaft geared with the ware holder and having a clutch and a driving gear therefor, a cam on the main shaft engaging the ware holding frame, and means operated by the cam for automatically disengaging the clutch.

9. A glass grinding machine having a reciprocable ware holding frame provided with a rotatable ware holder, a cutter, a main driving shaft geared with the ware holder and having a clutch and a driving gear therefor, a cam on the main shaft engaging the ware holding frame, a clutch lever provided with a notched locking pin, a latch therefor, and an abutment on the cam for engaging the latch to release the clutch.

10. A glass grinding machine having a reciprocable ware holding frame provided with a rotatable ware holder, a relatively adjustable cutter, a main driving shaft geared with the ware holder and having a clutch provided with a lifting cone, a loosely mounted clutch pulley, a lifting rod for the cutter having a terminal engaging the lifting cone, a cam on the main shaft engaging the ware holding frame, a clutch lever having a locking pin, a latch therefor, and an abutment on the cam for engaging the latch to release the clutch.

11. A glass grinding machine having a reciprocable ware holding frame provided with a rotatable ware holder, a relatively adjustable cutter, a main driving shaft geared with the ware holder and having a clutch provided with a lifting cone, a loosely mounted clutch pulley, a lifting rod for the cutter having a terminal engaging the lifting cone, a cam on the main shaft engaging the ware holding frame, a clutch lever having a locking pin, a latch therefor, an abutment on the cam for engaging the latch to release the clutch, and a retracting spring for the ware holding frame and clutch lever respectively.

12. A glass grinding machine having a reciprocable ware holding frame provided with a rotatable ware holder, means for annularly adjusting the ware holder and ware, a relatively adjustable cutter, a main driving shaft geared with the ware holder and having a clutch provided with a lifting cone, a loosely mounted clutch pulley, a lifting rod for the cutter having a terminal engaging the lifting cone, a cam on the main shaft engaging the ware holding frame, a clutch lever having a locking pin, a latch therefor, and an abutment on the cam for engaging the latch to release the clutch.

13. In combination, a frame, a slide bearing thereon, a reciprocable ware holder mounted in the slide bearing having a rotating shaft, a cutter and shaft therefor adjustably mounted above the ware holder, a main driving shaft geared with the ware holder shaft and having a clutch provided with a lifting cone, a loosely mounted clutch pulley, a lifting rod for the cutter shaft having a terminal engaging the lifting cone, a cam on the main shaft having an abutment, a co-acting roller on the ware holding frame, a clutch lever having a locking pin, a latch therefor extending into range of the cam abutment, a retracting spring for the ware holding frame, and a retracting spring for the clutch lever.

14. In combination with a driven cutter-wheel, a relatively adjustable ware holding frame provided with a power driven ware holder and a shifting cam, and means for securing the frame in retracted position with relation to the shifting cam.

5. In combination, a supporting standard, a ware holding frame slidably mounted therein, a shifting cam, a spring adapted to force the frame toward the cam, a securing set screw for holding the frame away from the cam, a rotating shaft provided with a ware holder, and a terminal clamping arm pivoted to the frame and having a ware engaging clamp.

6. In combination, a supporting standard, a ware holding frame slidably mounted therein, a shifting cam, a spring adapted to force the frame toward the cam, a securing set screw for holding the frame away from the cam, a rotating shaft provided with a ware holder, means for rotatably adjusting and securing the ware holder on the shaft, and a terminal clamping arm pivoted to the frame and having a ware engaging clamp.

7. In a machine of the class described, a power driven cutter shaft having a fixedly attached cutter-wheel, and a laterally adjustable rotatably engaged cutter-wheel operable therewith.

8. In a machine of the class described, a power driven cutter shaft having a fixedly attached cutter-wheel, a laterally adjustable rotatably engaged cutter-wheel having a hub, and a spring-pressed roller bearing thereon.

9. In a machine of the class described, a laterally movable power driven cutter shaft having a loosely mounted cutter-wheel, and a hub secured to the shaft having lost motion driving engagement with the cutter-wheel.

10. In a machine of the class described, a laterally movable power driven cutter shaft having a loosely mounted cutter-wheel, means for exerting spring pressure thereto, and a hub secured to the shaft having lost motion driving engagement with the cutter-wheel.

11. In a machine of the class described, a laterally movable power driven cutter shaft having a loosely mounted cutter-wheel, a hub thereon having pin openings, a spring-pressed pin having a roller engaging the cutter-wheel hub, and a rotating hub on the power shaft having pins engaging the pin openings with lost motion clearance.

In testimony whereof we hereunto affix our signatures.

EDWARD A. RYON.
ANNA T. RYON.